US006917276B1

(12) United States Patent
Menard et al.

(10) Patent No.: US 6,917,276 B1
(45) Date of Patent: Jul. 12, 2005

(54) BISTABLE SWITCH WITH SHAPE MEMORY METAL

(75) Inventors: Stefane Menard, Kirkland (CA); Jean-Claude Villeneuve, Boisbriand (CA); Normand Lassonde, Pincourt (CA); Michel Decarie, Verdun (CA)

(73) Assignee: Simpler Networks, Quebec (CA)

( * ) Notice: Subject to any disclaimer, the term of this patent is extended or adjusted under 35 U.S.C. 154(b) by 198 days.

(21) Appl. No.: 09/596,876

(22) Filed: Jun. 19, 2000

(51) Int. Cl.[7] .......................... H01H 37/50; H01H 37/32
(52) U.S. Cl. ........................ 337/140; 337/141; 337/14; 60/528
(58) Field of Search .......................... 337/14, 333, 121, 337/140, 339, 141, 343, 393; 148/563; 60/516, 527–529

(56) References Cited

U.S. PATENT DOCUMENTS

| | | | | | |
|---|---|---|---|---|---|
| 3,634,803 | A | * | 1/1972 | Willson et al. | 337/123 |
| 3,725,835 | A | * | 4/1973 | Hopkins et al. | 337/140 |
| 3,893,055 | A | * | 7/1975 | Jost et al. | 337/140 |
| 4,544,988 | A | * | 10/1985 | Hochstein | 361/211 |
| 4,700,541 | A | * | 10/1987 | Gabriel et al. | 60/528 |
| 4,772,807 | A | * | 9/1988 | Bouvot | 307/119 |
| 4,864,824 | A | * | 9/1989 | Gabriel et al. | 60/527 |
| 4,887,430 | A | * | 12/1989 | Kroll et al. | 60/527 |
| 5,206,775 | A | * | 4/1993 | Wilson | 361/15 |
| 5,410,290 | A | * | 4/1995 | Cho | 337/140 |
| 5,990,777 | A | * | 11/1999 | Whiteman, Jr. | 337/140 |
| 6,016,096 | A | * | 1/2000 | Barnes et al. | 337/123 |

FOREIGN PATENT DOCUMENTS

| | | | |
|---|---|---|---|
| DE | 3731 146 A1 | 3/1989 | |
| DE | 3731146 A1 * | 3/1989 | ............ F03G/7/06 |
| DE | 197 57 024 C1 | 6/1999 | |
| EP | 0 0515 024 A3 | 11/1992 | |
| EP | 0 515 024 A2 | 11/1992 | |
| JP | 1-183027 * | 7/1989 | ................. 335/144 |

* cited by examiner

Primary Examiner—Anatoly Vortman
(74) Attorney, Agent, or Firm—Howrey LLP

(57) ABSTRACT

A bistable shape memory alloy (SMA) micro-switch includes a single continuous SMA element such as a nitinol wire that provides bi-directional motion for switching functions. Bifunctional contact arms provide a mechanical force to maintain an open state of the micro-switch in addition to conducting current through a circuit. The SMA element includes first and second segments that are alternately heated above a transition temperature to cause the SMA element to alternate between first and second conformations. A cursor attached to the SMA element moves from a first position to a second position as the SMA element moves from its first to its second conformation. To close the SMA micro-switch, the contact arm is moved from an open position to a closed position through sliding contact with the cursor as the cursor moves from its second position to its first position. Friction generated by contact between the cursor and the contact arm maintains the cursor in its first position and the SMA micro-switch in its closed state.

24 Claims, 10 Drawing Sheets

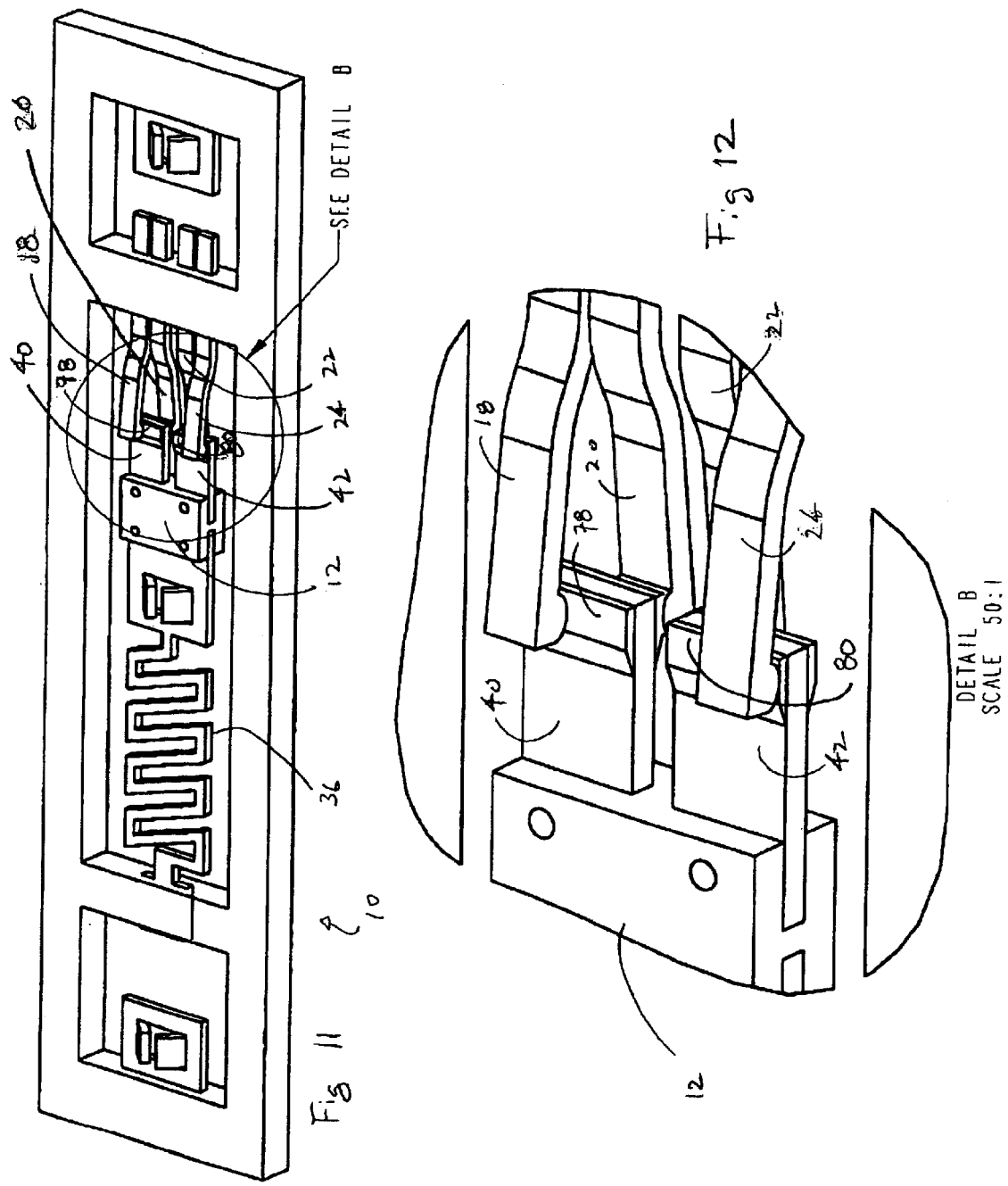

BISTABLE SWITCH WITH SHAPE MEMORY METAL

BACKGROUND OF THE INVENTION

1. Field of Invention

This invention relates in general to micro-actuators and, more particularly, to a bistable switch at least partially constructed of shape memory alloy (SMA).

2. Description of the Related Art

The first electro-mechanical and solid state micro-switches were developed in the late 1940's. The importance of micro-switch technology has increased as the trend toward miniaturization of electrical components developed. Current electro-mechanical micro-switches are expensive and complex to construct. Moreover, the components of current electro-mechanical micro-switches tend to be susceptible to mechanical breakdown. Solid state micro-switches are characterized by high on-state resistance, and, for many applications, undesirably high on-state "contact" coupling capacitance.

Another trend in the area of electronic switches has been to utilize SMA's to perform switching functions. A SMA material is a specialized alloy that exhibits a given mechanical movement in response to heating above a threshold temperature. The movement is relatively precise, predictable, and repeatable. When the SMA material is allowed to cool below the threshold temperature, it attains a ductile state. The SMA material is chiefly characterized by this ability to undergo reversible transformations between a first conformation at a sub-threshold temperature and a second conformation at a temperature above the threshold.

U.S. Pat. No. 4,887,430 to Kroll et al. describes a bistable shape memory alloy (SMA) actuator having separate first and second SMA elements that move an actuator along a travel stroke between first and second positions. The Kroll actuator selectively heats the first and second SMA elements to move the actuator between the first and second positions. The actuator employs a mechanical frictional retainer to bias the actuator in its first and second positions.

The Kroll invention can be utilized to provide bistable mechanical actuation. However, the means for biasing the transducer or actuator in its first and second positions is mechanically separate and distinct from the element being actuated. Additionally, the Kroll actuator employs two or more separate SMA wires to provide movement between the first and second positions. Consequently, the Kroll device is not well suited for micro-switch designs that require the minimum number of components.

What is needed is a bistable SMA switch that is suitable for use as a micro-switch that is inexpensively manufacturable.

SUMMARY OF THE INVENTION

The present invention provides a SMA switch for use as a micro-switch. It has many aspects, as described herein. According to one aspect of the present invention, a SMA switch includes electrically conductive contact arms in sliding contact with a cursor that reciprocates between first and second positions to respectively trigger closed and open states of the switch. The cursor is moved between its first and second positions by a single continuous SMA element. In one embodiment the cursor includes a projection which interacts with one of the contact arms to maintain the cursor in the first position to thereby maintain the closed state of the switch.

The single continuous SMA element can be a wire constructed of an alloy such as nitinol attached to a substrate at two different positions. The SMA element has first and second segments that are capable of being heated separately. In a preferred embodiment a first circuit heats the first segment when it conducts current and a second circuit heats the second segment when it conducts current. When the first segment is heated above a predetermined transition temperature and the second segment is maintained below the transition temperature, the first segment contracts to place the SMA element in a first conformation. When the second segment is heated above the transition temperature while the first segment is maintained below the transition temperature, the second segment contracts to place the SMA element into a second conformation.

The cursor is mechanically coupled to the SMA element between the SMA element's first and second segments. As the SMA element moves from its first to its second conformation, the cursor moves from its first to its second position. This movement of the cursor from its first to its second position causes a first contact arm to move to open the SMA switch.

In one embodiment, the bistable SMA switch includes a second electrically conductive contact arm disposed in sliding contact with a second surface of the cursor that is opposite a first surface of the cursor contacting the first contact arm. In this embodiment, the cursor includes a short bar that extends from the first surface to the second surface of the cursor. When the cursor is in its first position, the first and second contact arms are electrically coupled via the short bar to close the SMA switch. The short bar has contact points that are recessed so that the contact arms are able to secure the cursor in its first position to maintain the closed state of the switch.

In a preferred embodiment, the first and second contact arms are both located on the same side of the cursor. The first contact arm is located within the travel path of the cursor as it travels from its second position to its first position so that the first contact arm is moved into direct contact with the second contact arm to close the switch. In a preferred embodiment the second contact arm is biased to exert a force on the first contact arm. The first contact arm transmits the force to the cursor. When the cursor is in the first position, this force maintains the cursor in its first position to maintain the closed state of the switch. This force must be overcome to move the cursor projection past the first contact arm (thereby displacing the first contact arm and the second contact arm) as the cursor moves from the first to the second position.

The first and second circuits that selectively heat the first and second segments of the SMA element share a common ground electrically coupled to the substrate. In a preferred embodiment, the ground includes a spring element that provides flexibility to permit the SMA element to alternate between the first and second conformations while maintaining electrical contact between the ground and the SMA element. In an alternative embodiment, the common ground includes a brush element that is in sliding contact with a fixed ground element attached to a mounting surface. The brush element is electrically coupled to the SMA element to enable the SMA element to alternate between its first and second conformations while maintaining electrical contact between the SMA element and the fixed ground element. In another embodiment the ground comprises a wire bond electrically connecting the SMA element to the mounting surface via the cursor.

The cursor is preferably constructed of a combination metal and plastic and the first and second contact arms are preferably constructed by a machine stamping or an etching process.

BRIEF DESCRIPTION OF THE DRAWINGS

FIGS. 11–12 illustrate an alternative embodiment of the present invention.

DETAILED DESCRIPTION OF THE INVENTION

The present invention employs the unique properties of a shape memory alloy ("SMA") together with recent advances in micro-machining and etching to develop an efficient, effective and highly reliable micro-switch. The use of an SMA element in micro-switches increases the performance of switches or relays by several orders of magnitude. This increase in performance is accomplished because both stress and strain of the shape memory alloy can be very large, providing substantial work output per unit volume. Micromechanical switches using an SMA element as the actuation mechanism can exert stresses of hundreds of megapascals, tolerate strains of more than four percent and can work at common TTL voltages that are much lower than electrostatic or PZO requirements. Moreover, these SMA micro-switches can survive millions of cycles without fatigue.

SMA materials undergo a temperature related phase change when they reach temperatures above a threshold or transition temperature. The SMA material possesses a particular structure at a temperature below the transition temperature. When the temperature of the SMA material increases above the transition temperature, the structure of the SMA material is altered. If the SMA material has a wire shape, as the SMA wire exceeds the transition temperature, the wire contracts to a known and reproducible extent. It is this property of SMA materials that is utilized to perform the switching functions of the present invention.

According to one of its aspects, the present invention employs a single continuous SMA wire to provide bidirectional mechanical forces for performing switching functions. Furthermore, contact arms that may be part of the circuit that the switch controls provide mechanical forces to maintain the SMA switch of the present invention in its closed state. Those features facilitate the incorporation of SMA material into micro-switches by reducing the number of mechanical and electrical components required to operate an SMA micro-switch.

Figure 1:
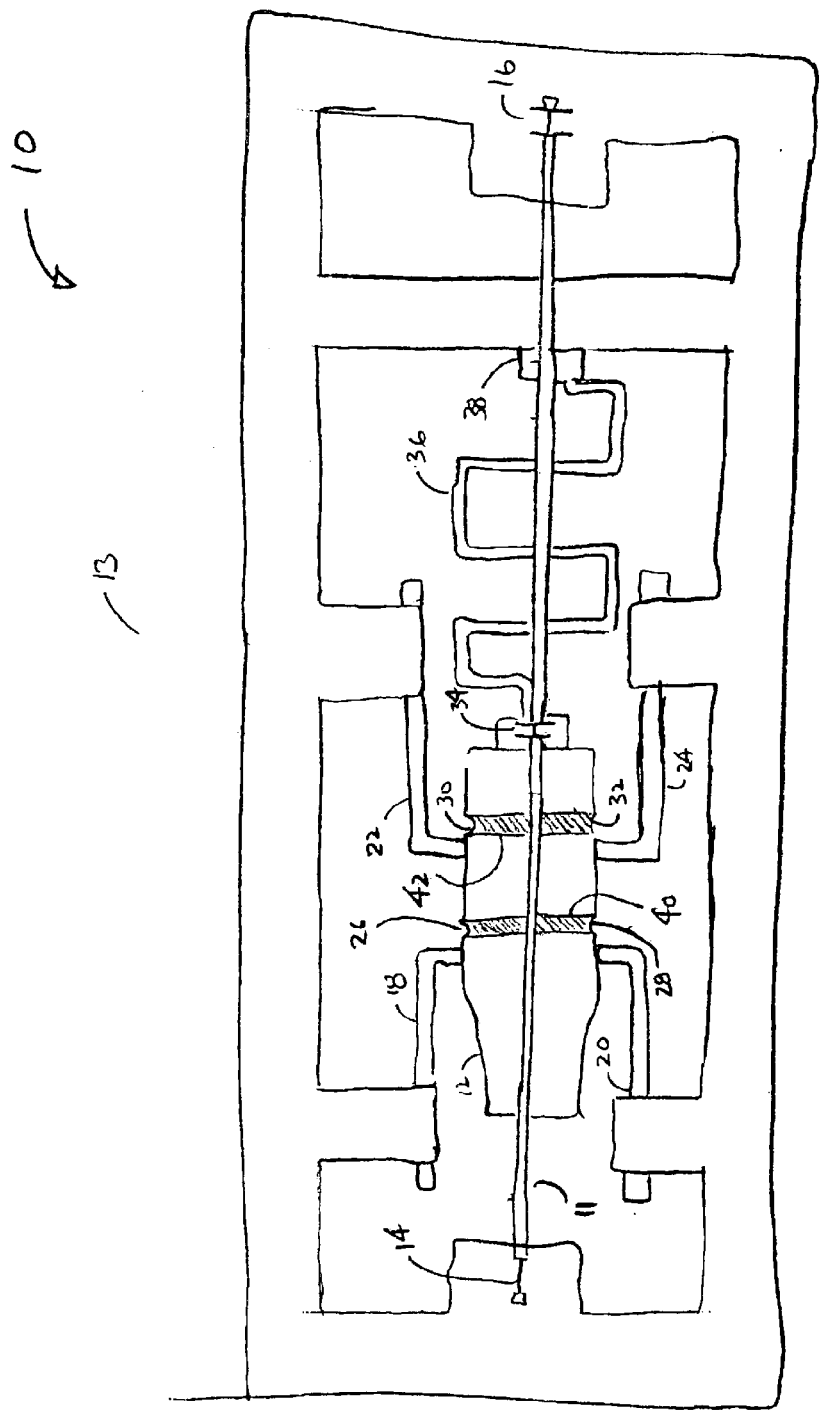
FIG. 1 is a schematic diagram of an embodiment of the bistable SMA micro-switch of the present invention.

Turning now to the drawings, FIG. 1 illustrates a thermally-actuated bistable SMA micro-switch 10 in accordance with one embodiment of the present invention. The micro-switch includes a single continuous SMA element that is preferably constructed of nitinol wire 11. Nitinol is an alloy of nickel and titanium. Substitutes for nitinol are well-known in the art. The nitinol wire 11 is secured to a substrate 13 at first and second attachment points 14 and 16. The substrate is constructed of an electrically conductive material and provides the points of attachment for the endpoints of the nitinol wire 11. The substrate can be mounted onto a printed circuit board, a flat plate of a ceramic material such as high density alumina ($Al_2O_3$) or beryllia (BeO), a glassy material such as fused silica, or any other material that can act as a support for the inventive switch structure.

Figure 5:
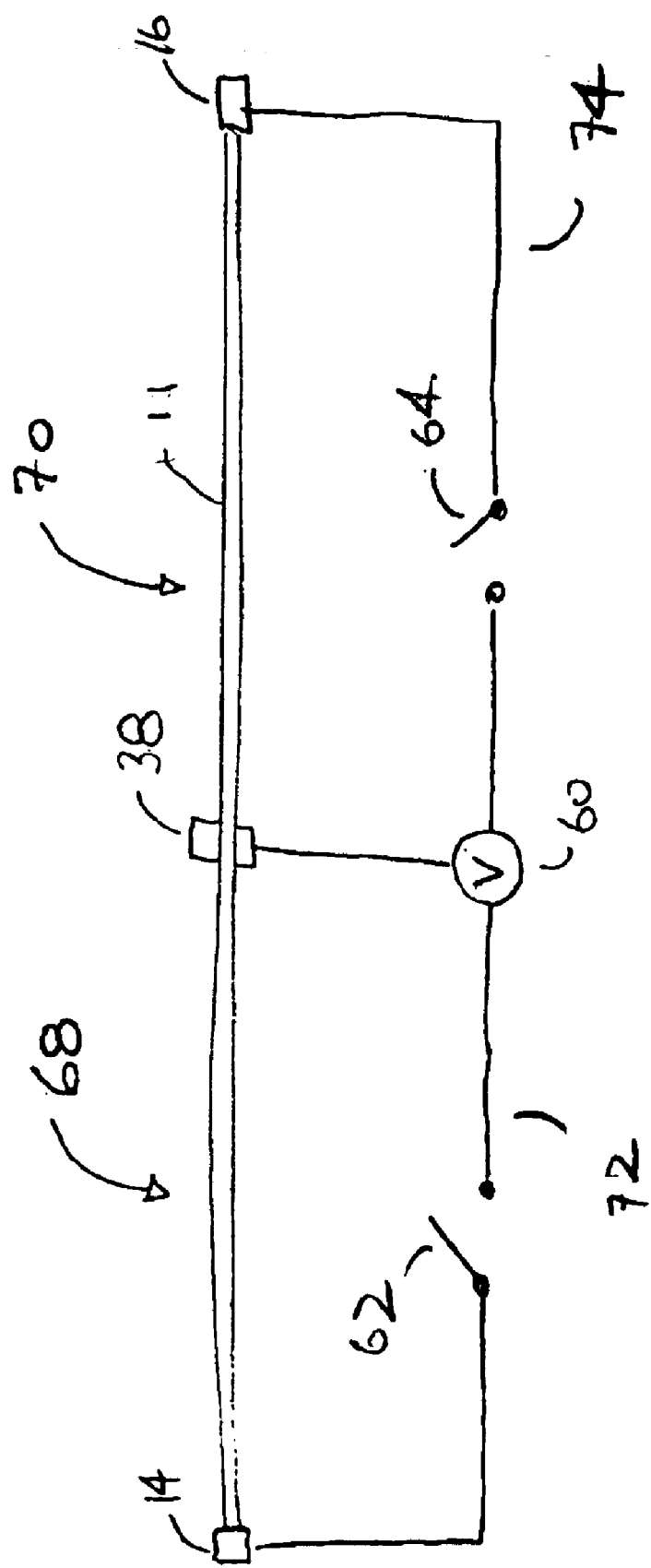
FIG. 5 is a circuit diagram of two circuits that provide the means for selectively heating first and second segments of the nitinol wire of the SMA micro-switch.

The nitinol wire 11 can be attached at points 14 and 16 by crimping or other suitable means. By securing the nitinol wire to the substrate and selectively heating segments of the nitinol wire 11, the conformation of the nitinol wire is selectively altered. Referring to FIGS. 1 and 5, a means for selectively heating first and second segments 68 and 70 of the nitinol wire 11 is provided by first and second circuits 72 and 74. The first and second circuits share a common ground 38. A first switch 62 opens and closes the first circuit and a second switch 64 opens and closes the second circuit. In the operation of the bistable SMA micro-switch 10, the first and second switches 62 and 64 are coordinated so that if the first switch is closed, the second switch is opened and if the second switch is closed, the first switch is opened. When the first circuit 72 is closed, the first segment 68 of the nitinol wire 11 conducts current and, as a result, is heated above its transition temperature. Consequently, the first segment 68 contracts to place the nitinol wire 11 in its first conformation. The contraction of the nitinol wire requires a means, discussed in detail below, for maintaining electrical contact between the nitinol wire 11 and the ground 38 while permitting movement of the nitinol wire. When the second circuit 74 is closed, current runs through the second segment 70 of the nitinol wire thereby causing the second segment to contract to place the nitinol wire into its second conformation. The first and second segments of nitinol wire could be replaced with two separate nitinol wires, according to some embodiments of the invention. The nitinol wire, in combination with the first and second circuits 68 and 70, functions as a transducer converting electrical energy into mechanical energy.

In a preferred embodiment, the means for maintaining electrical contact between the nitinol wire 11 and the common ground 38 is provided by a spring element 36 that extends to a ground attachment point 34 for the nitinol wire 11. The spring element 36 is flexible to permit the nitinol wire to alternate between its first and second conformations while maintaining the connection between ground attachment point 34 and common ground 38. A cursor 12 is connected to the nitinol wire 11 so that, as the nitinol wire alternates between its first and second conformations, the cursor 12 is moved back and forth along its longitudinal axis. When the nitinol wire 11 is in its second conformation as shown in FIG. 1, the cursor 12 is in its second position. When the first circuit 72 closes causing the first segment 68 to contract so that the nitinol wire to moves into its first conformation, the cursor 12 is moved into its first position (not shown).

The cursor 12 may include a first short bar 40 and a second short bar 42 that are both made of an electrically conductive material. Although the cursor of FIG. 1 is shown as having two short bars, it can have fewer or more than two. The SMA micro-switch further includes two opposing sets of electrically conductive contact arms: first and second contact arms 18 and 20, and third and fourth contact arms 22 and 24. The contact arms are fastened to the mounting surface by soldering or some other well known means. When the cursor is in its second position as shown in FIG. 1, the SMA micro-switch is open because the contact arms are uncoupled from their respective short bars. When the cursor 12 is moved into its first position, the first and second contact arms 18 and 20 are electrically coupled via the first short bar 40 and the third and fourth contact arms 22 and 24 are electrically coupled via the second short bar 42. The contact arms each are connected to electrical pads (not shown) on the mounting surface. When the cursor is in its first position and the opposing contact arms are electrically coupled via their respective short bars, the SMA micro-switch 10 is in its closed state. That is, current may flow from contact arm 18 to contact arm 20 through short bar 40, and similarly current may flow from contact arm 22 to contact arm 24 through short bar 42.

The first short bar 40 includes first and second contact points 26 and 28 and the second short bar 42 includes third and fourth contact points 30 and 32. In a preferred embodiment, the contact points are recessed with respect to the surface of the cursor so that, when the contact arms are coupled with their respective contact points, the contact arms secure the cursor 12 in its first position to maintain the SMA micro-switch 10 in its closed state.

Figure 2:
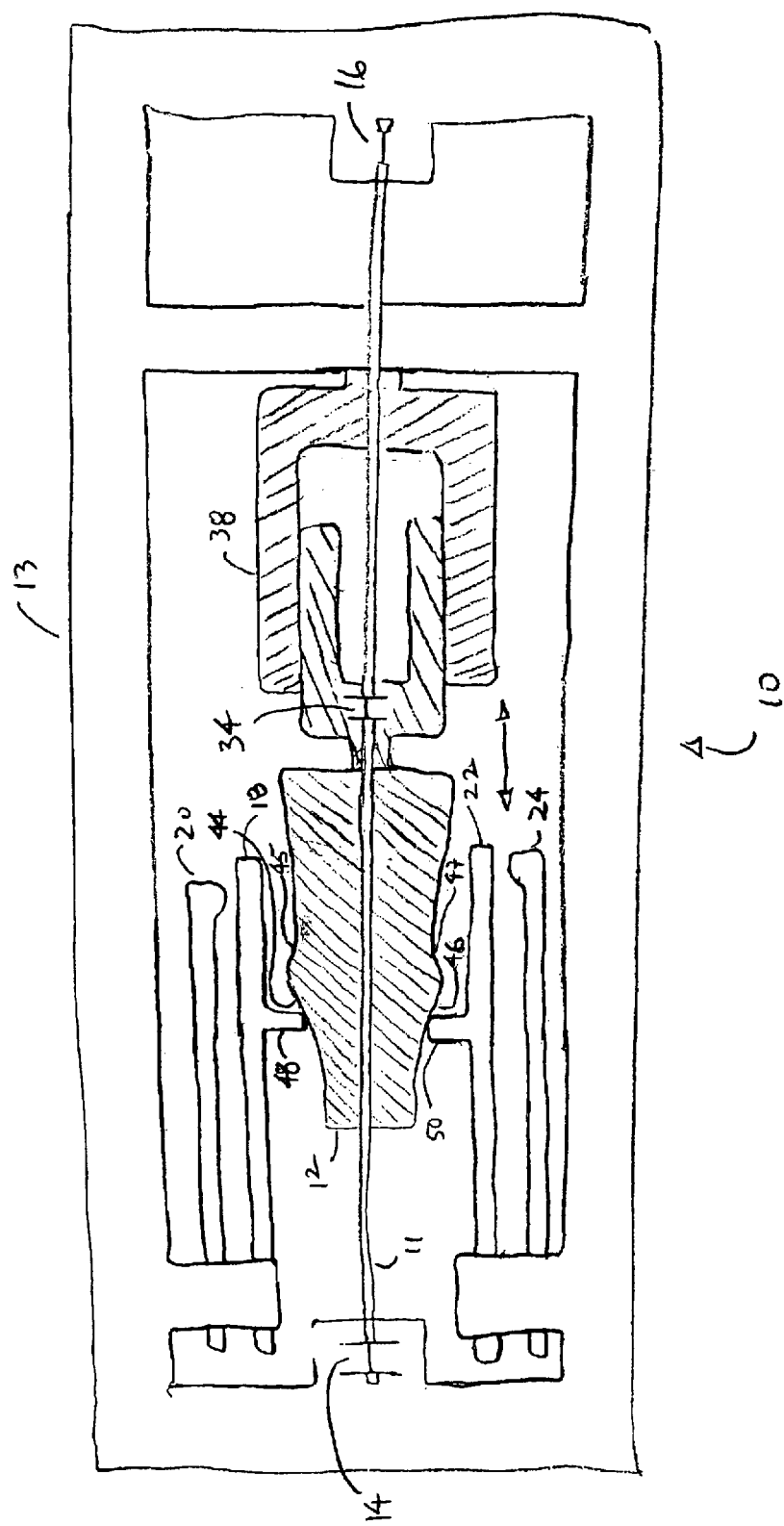
FIG. 2 is a schematic diagram of another embodiment of the bistable SMA micro-switch.

Referring to FIG. 2, in another embodiment of the SMA micro-switch 10, the lateral surfaces of the cursor 12 do not include short bars to electrically couple the first and second contact arms 18 and 20 to each other and to contact the third and fourth contact arms 22 and 24 to each other. Instead, the first and third contact arms 18 and 22 are located within the travel path of the cursor 12 as it moves from its second to its first position. The cursor 12 is tapered at its left end so that, when it is in its second position, the cursor does not contact the first 18 or third 22 contact arm. However, as the cursor 12 moves from its second position to its first position, the cursor's first and second beveled surfaces 44 and 46 come into contact with extensions 48 and 50 that project respectively from first and third contact arms 18 and 22 toward the cursor 12. As the cursor continues toward its first position, the beveled surfaces 44 and 46 push the first and third contact arms 18 and 22 respectively into contact with the second and fourth contact arms 20 and 24. When the cursor 12 arrives at its first position, the extensions 48 and 50 projecting from first and third contact arms 18 and 22 come to rest on the slightly tapered surface of the cursor to the right of the beveled surfaces 44 and 46, where they are held in place by friction and mechanical force.

In a preferred embodiment, the lateral surfaces of the cursor 12 include first and second projections 45 and 47. The projections provide an obstacle against the movement of the cursor from its first to its second position. The second and fourth contact arms 20 and 24 preferably exert forces respectively through first and third contact arms 18 and 22 urging the first and third contact arms against the lateral surfaces of the cursor. Sufficient force must be generated by the first segment 68 of the nitinol wire 11 to overcome the biases of the second and fourth contact arms 20 and 24 to enable the projections 45 and 47 to pass by the first and second contact arm extension 48 and 50.

When the cursor 12 is in its first position, the first contact arm 18 is forced into abutment with the second contact arm 20 and the third contact arm 22 is forced into abutment with the fourth contact arm 24. Although not shown in FIG. 2, the contact arms 18, 20, 22, 24 are electrically coupled to leads on the mounting surface. When the cursor is in its first position and the first and second contact arms 18 and 20 are coupled and the third and fourth contact arms 22 and 24 are coupled, the SMA micro-switch is closed and current flows through the electrically coupled contact arms. When the cursor 12 reverts back to its second position, the contact arms uncouple and the SMA micro-switch 10 opens.

Figure 3:
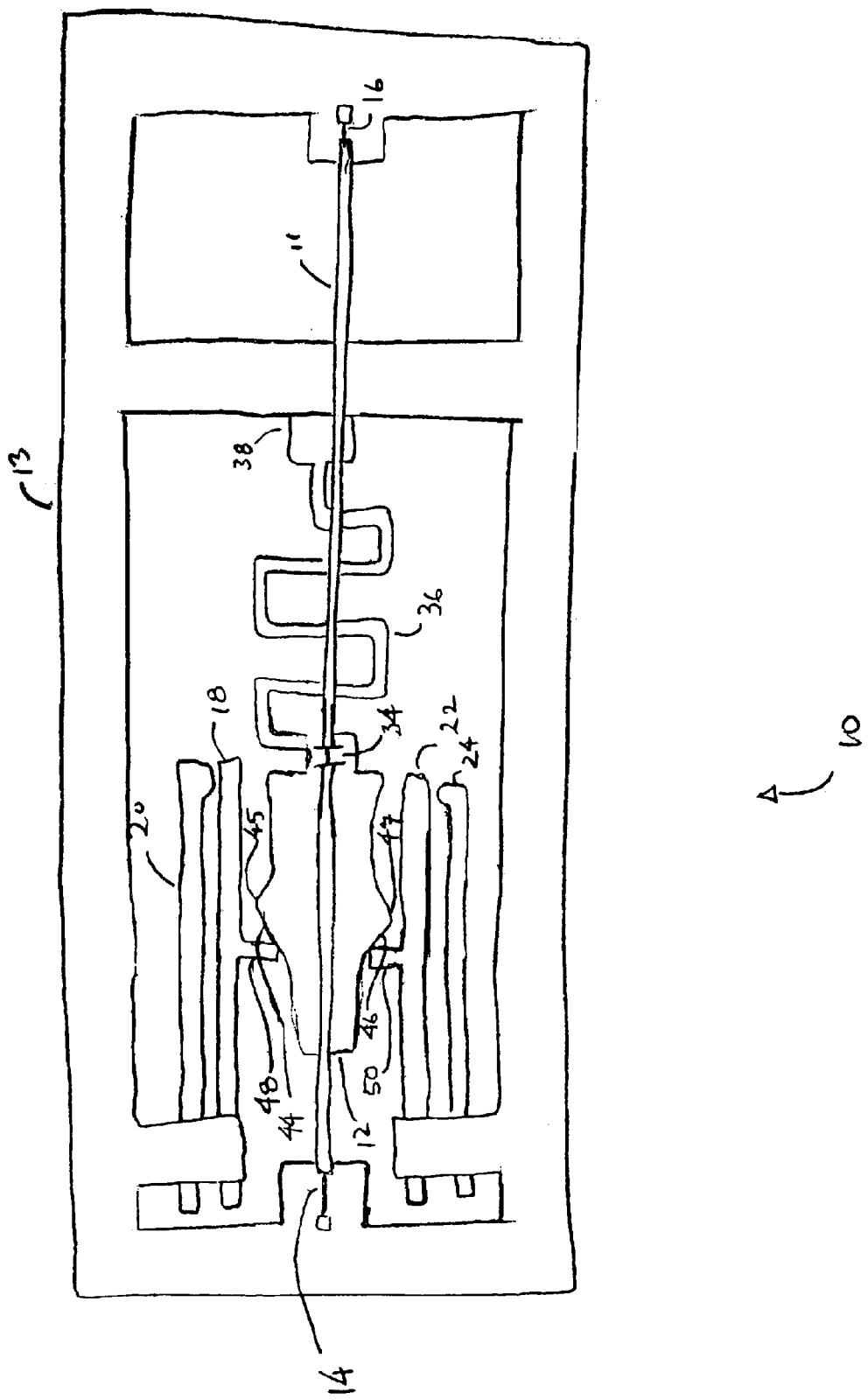
FIG. 3 is a schematic diagram illustrating a preferred embodiment of the bistable SMA microswitch.

Instead of a spring element 36, an alternative embodiment utilizes a brush element 54 connected to the cursor 12 to maintains sliding contact with the common ground 38 as the cursor alternates between its first and second positions. Alternative embodiments will be apparent that also allow a dynamic contact between the nitinol wire 11 and common ground node 38 using sliding elements or other assemblies. The two different embodiments of the means for maintaining contact between the nitinol wire 11 and the common ground 38 can be utilized interchangeably with either the cursor/contact arm assembly of FIG. 1, FIG. 2 or FIG. 4. FIG. 3 shows a preferred embodiment wherein the cursor/contact arm assembly of FIG. 2 is combined with the spring element 36 of FIG. 1. An alternative embodiment of the common ground node provides a wire bonded from the mounting surface to the nitinol wire via the cursor.

Figure 4:
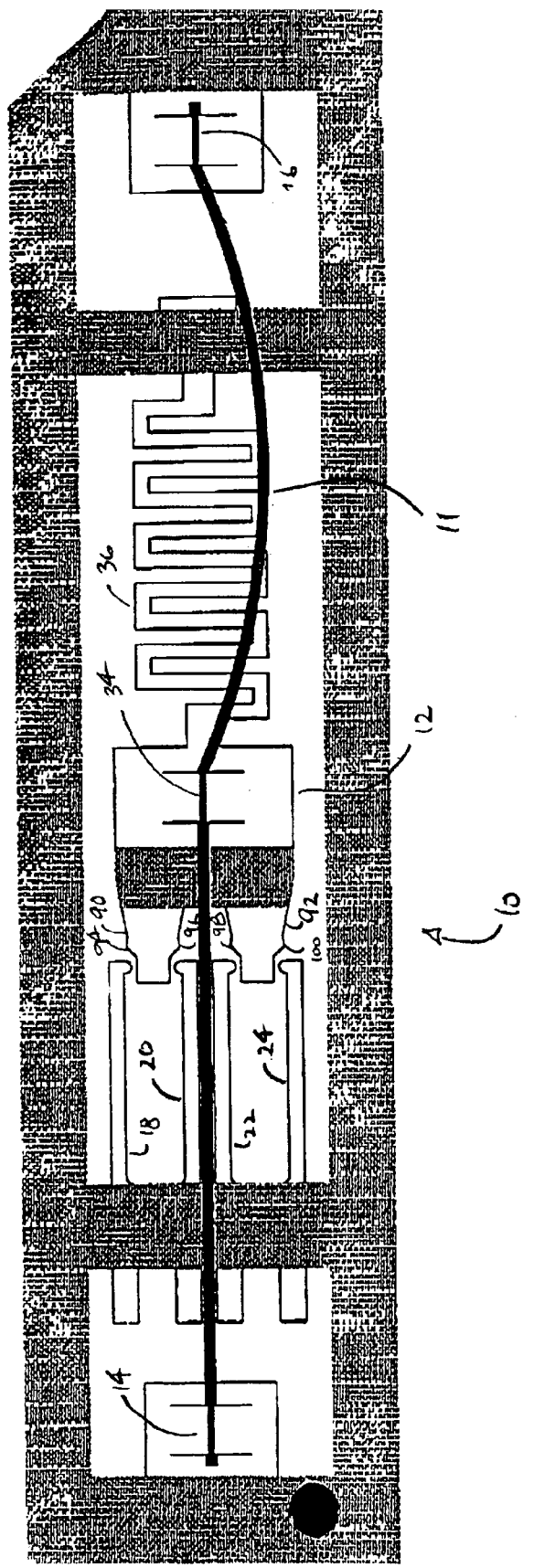
FIG. 4 is a schematic diagram illustrating an alternative double-cursor embodiment of the bistable SMA microswitch.
Figure 6:
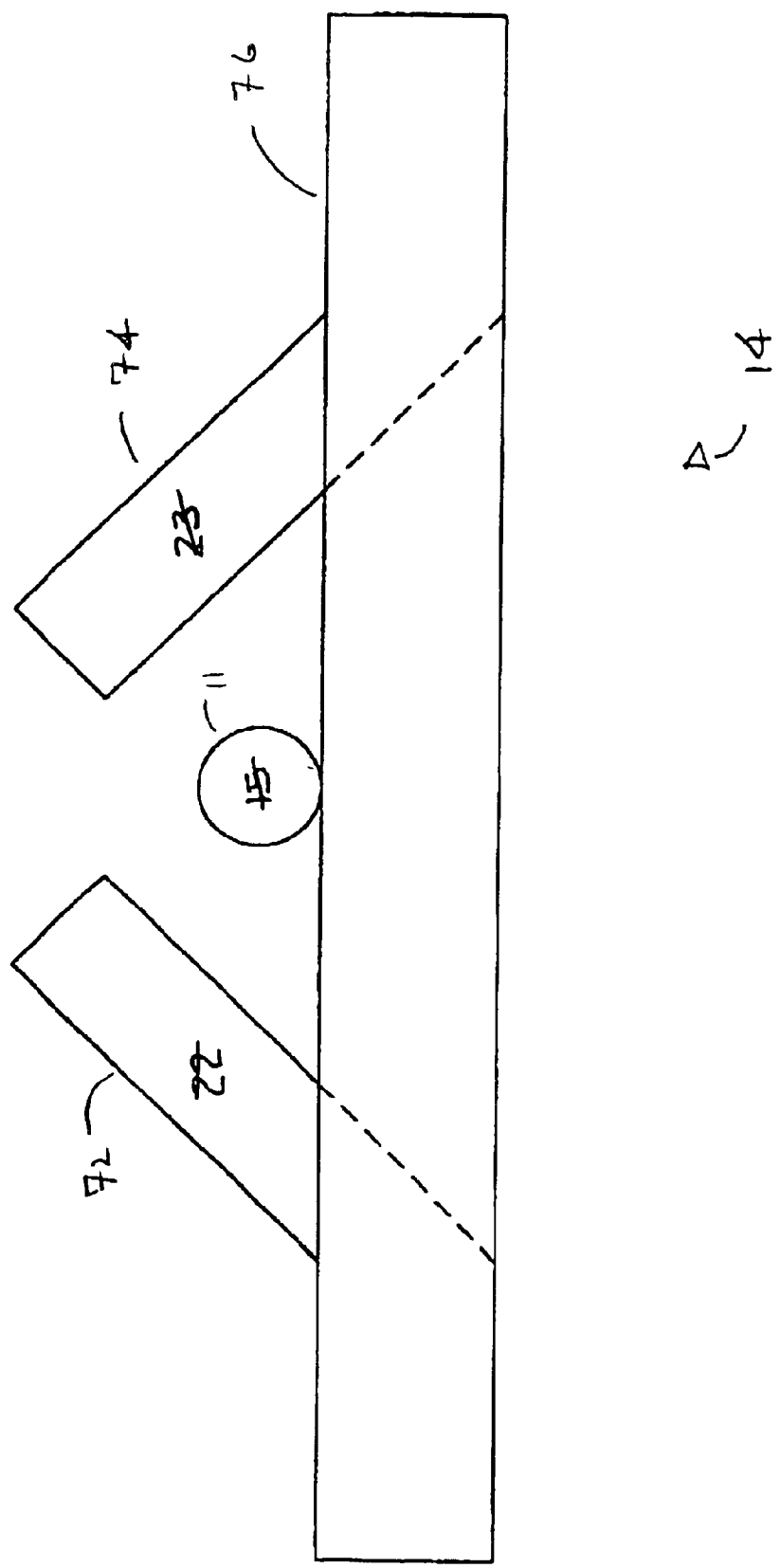
FIG. 6 is a schematic diagram illustrating one embodiment for fixedly securing a SMA element in the present invention.
Figure 7:
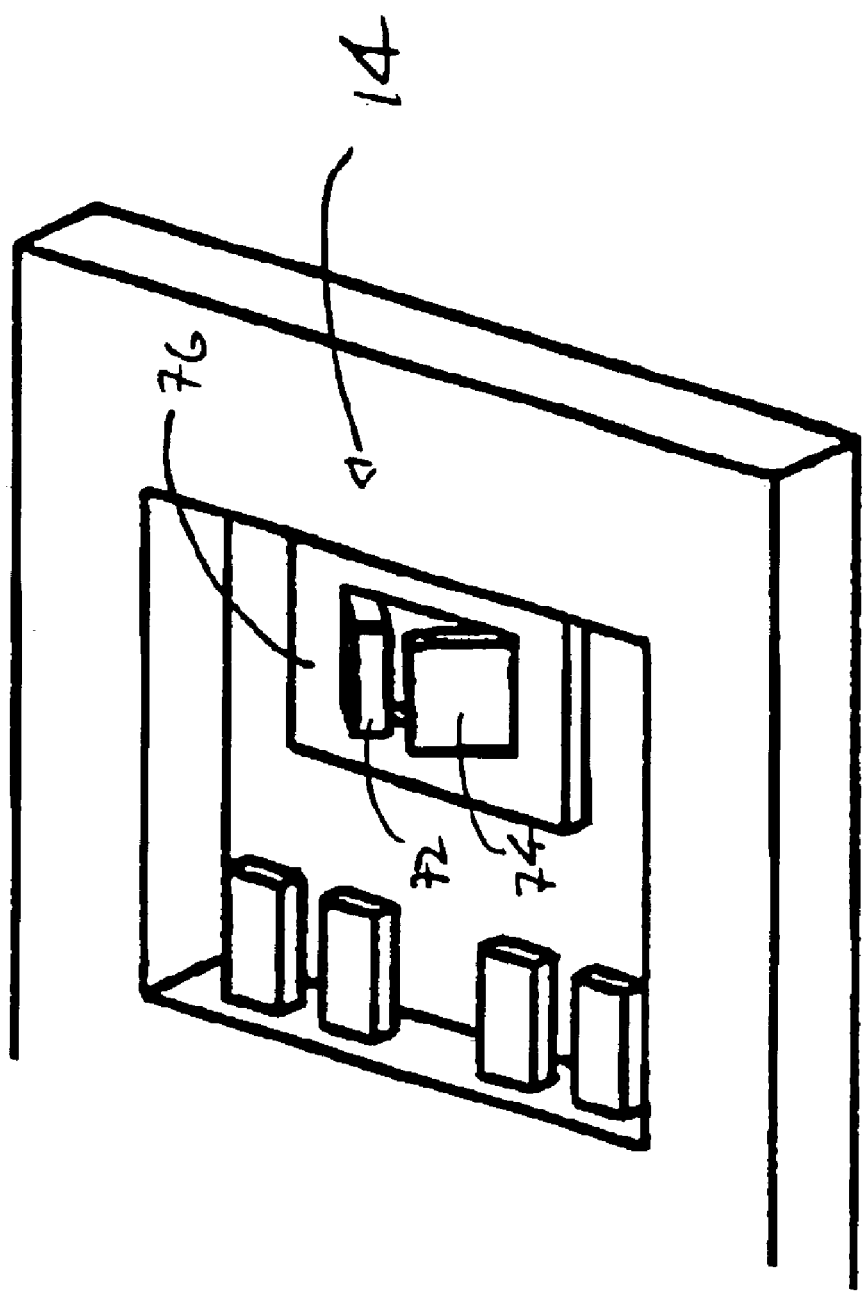
FIG. 7 is a perspective view of the SMA element securing mechanism illustrated in FIG. 6.

FIG. 4 illustrates another alternative embodiment that employs a two-headed cursor 12. A first head 90 has two projections 94 and 96 on its lateral surfaces that function to maintain the cursor in its first position. A second head 92 also has two projections 98 and 100 to help maintain the closed state of the switch by maintaining the cursor 12 in its first position. In this alternative embodiment, the portions of the first and second heads 90 and 92 (in contact with the first 18, second 20, third 22 and fourth 24 contact arms) are made of a conductive material. The cursor in FIG. 4 is shown in its second position so that the switch is open. When the cursor moves into its first position, first and second contact arms become electrically coupled via the first cursor head 90 and the third and fourth contact arms become electrically coupled via the second cursor head Referring to FIGS. 6 and 7, in one embodiment, the SMA element 11 is fixedly secured at the first point of attachment 14 utilizing a machine stamping technique. The material to which the SMA element is secured is an electrically conductive material 76 constructed, for example, of a suitable metal. The machine stamping technique punctures the conductive material to create flaps 72 and 74. The two flaps have three edges created by the machine stamping process. By bending the flaps 72 and 74 out of the plane of the conductive material, a space is created in which the SMA element can be inserted. FIGS. 6 and 7 show the space created by bending the flaps in this manner. By bending the ends of the flaps back toward the plane of the conductive material after the SMA element has been inserted into the space, the SMA element is fixedly secured at the first attachment point 14. Other means of securing can include welding or soldering.

Figure 8:
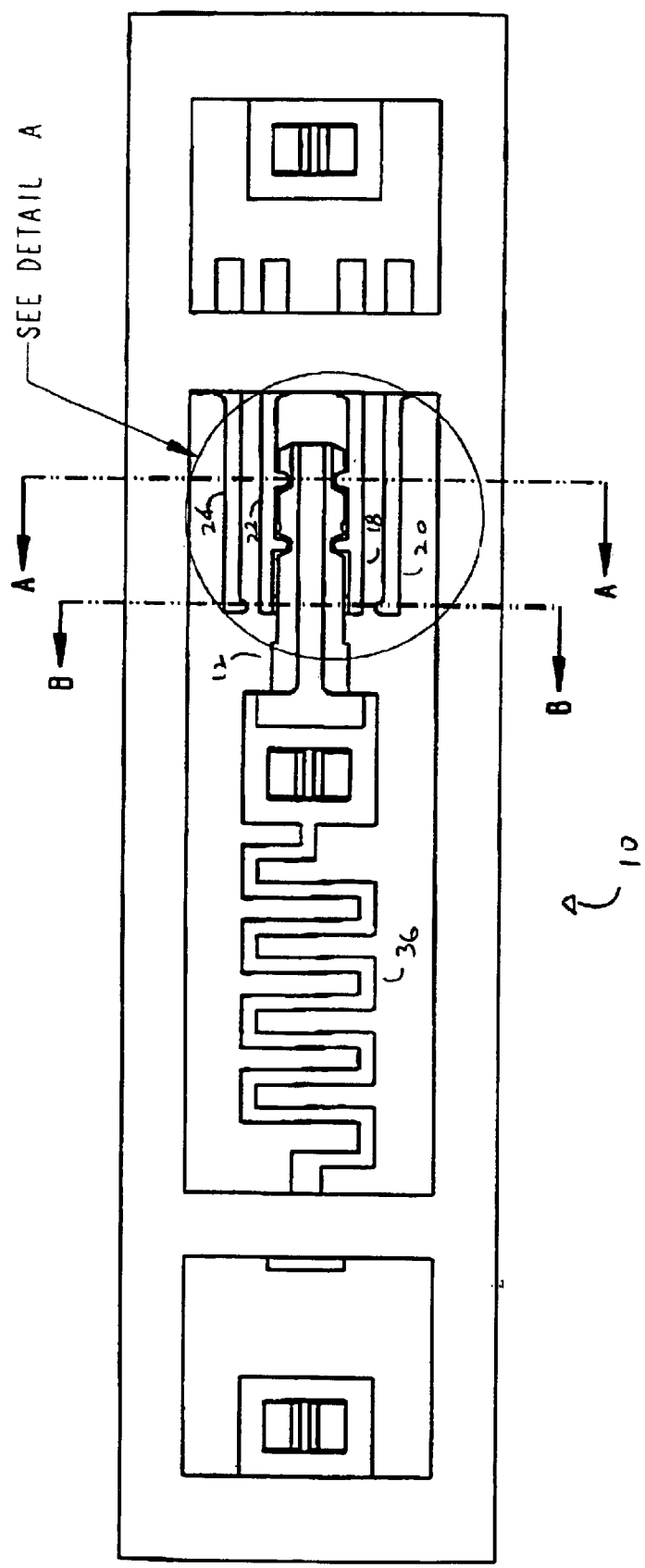
FIG. 8 is a schematic diagram of one embodiment of a cursor of a bistable SMA microswitch according to the present invention.
Figure 9:
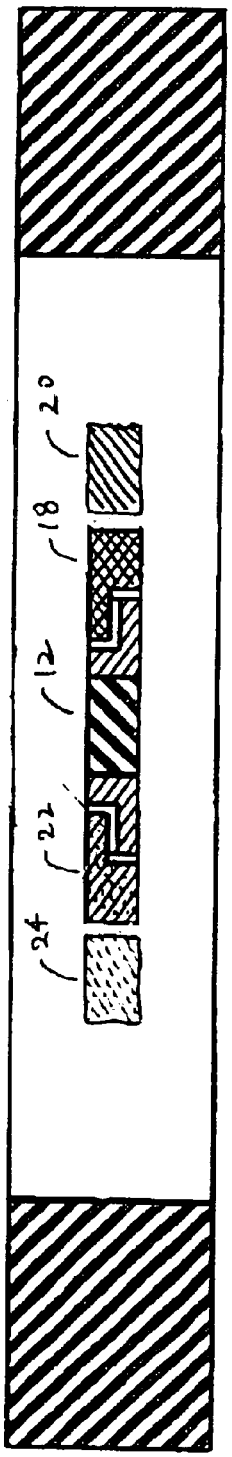
FIG. 9 is a cross section of the cursor and the contact arms of the switch along line A—A in FIG. 8.
Figure 10:
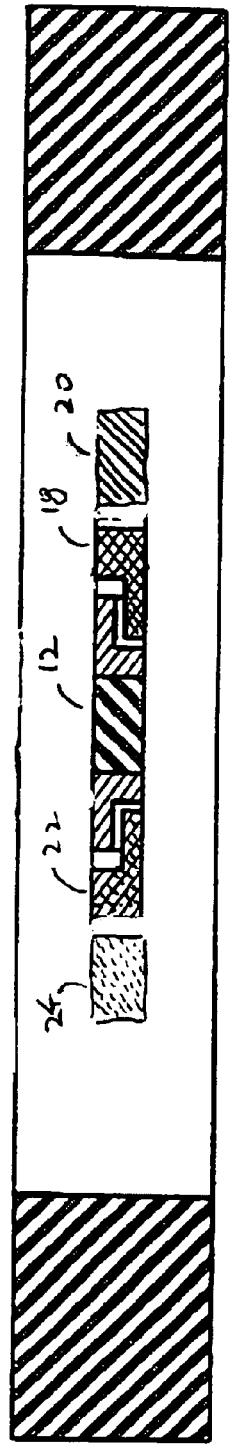
FIG. 10 is a cross section of the cursor and the contact arms of the switch along line B—B in FIG. 8.

One concern addressed by the present invention is the need to control the motion of the cursor 12 so that the contact arms are maintained within the same plane with the cursor as the cursor moves between its first and second positions. In a preferred embodiment, a half-etching technique is utilized to construct the contact arms and the cursor to maintain co-planarity between the contact arms and the cursor during operation of the switch 10. FIG. 9 shows a cross section of the switch 10 taken along line A—A in FIG. 8. FIG. 10 shows a cross section taken along line B—B in FIG. 8. As shown in FIG. 9, a first region of the cursor 12 is half-etched from top. The top surface of the cursor is etched away along its outside edges to create grooves along the two outside lateral edges of the length of the cursor 12. The contact arms are half-etched from the bottom to form grooves along the length of the contact arms 18 and 22. These grooves along the bottom lengths of the contact arms 18 and 22 are complementary to the grooves along the lateral edges of the length of the cursor. When the contact arms are fixedly secured into the position shown in FIG. 9, the contact arms prevent the cursor from moving in an upward direction while the cursor moves along its long axis.

As shown in FIG. 10, the half-etching patterns of the cursor and the contact arms at the plane intersected by line B—B differ from the half-etching patterns shown in FIG. 9. The outside edges along the length of the cursor are half-etched from the bottom. The contact arms are half-etched from the top. When assembled as in FIG. 10, the grooves along the length of the outside edge of the cursor interlock with the grooves along the top length of the first and third contact arms 18 and 22. This interlocking allows the cursor to move along its long axis while restricting its downward movement.

The interlocking between the cursor 12 and the first and third contact arms 18 and 22 shown in FIG. 9 restricts upward movement of the cursor while the interlocking between the cursor and the contact arms shown in FIG. 10 restricts the downward movement of the cursor. This complementary half-etching pattern of the cursor and contact arms maintains co-planarity between the cursor and contact arms while the cursor moves along its long axis between its first and second positions.

FIGS. 11 and 12 illustrate another embodiment of the switch 10. In this embodiment of the switch, the first and second short bars 40 and 42 extend out from the cursor 12. The orientation of the short bars is co-planar with respect to the remaining portion of the cursor. A first insulator 78 made of an electrically insulating material is attached to the upper surface of the first short bar and a second insulator 80 is attached to the upper surface of the second short bar. The insulators can be located on either the upper or lower surfaces or both surfaces of the short bars. The contact arms in this embodiment are in sliding contact with the top and bottom surface short bars 40 and 42 of the cursor 12. Specifically, the first and second contact arms 18 and 20 are respectively in sliding contact with the top and bottom surface of the first short bar 40 and the third and fourth contact arms 22 and 24 are respectively in sliding contact with the top and bottom surfaces of the second short bar 42.

The opposing forces exerted on the first contact bar 40 by the first and second contact arms 18 and 20 and the opposing forces exerted on the second contact bar by the third and fourth contact arms restrict the upward and downward movement of the cursor. When the cursor is positioned so that the contact arms are in direct contact with the short bars, the switch is closed. When the cursor is positioned so that the first insulator 78 contacts the first contact arm 18 and the second insulator 80 contacts the fourth contact arm 24, the switch is open.

One of the prime benefits of the invention disclosed herein is the simplicity of its manufacture. For example, the conductive metal elements may be made by a simple stamping process, the cursor may be made of injection-molded plastic, and nitinol wire may be made of a single piece of wire.

The foregoing description of particular embodiments does not limit the scope of the invention, as defined by the claims that follow. Those skilled in the art will recognize that there are many alternative embodiments that use the inventive ideas of the present invention without adopting the details of implementation disclosed herein.

Although the actuator of the present invention has been described in the concept of an electrical switch, those skilled in the art will recognize that aspects of the invention are equally applicable to other mechanical actuators, such as those for opening and closing valves, tilting mirrors, etc.

What is claimed is:

1. A shape memory alloy (SMA) switch comprising:
    a substrate;
    a continuous SMA element attached to said substrate at first and second locations and having a first portion and a second portion, said first portion contracting to place said SMA element in a first conformation upon being heated above a predetermined temperature and said second portion contracting to place said SMA element in a second conformation upon being heated above said predetermined temperature;
    a cursor attached to said SMA element at a location substantially intermediate said first and said second portions to reciprocate between a first position when said SMA element is in said first conformation and a second position when said SMA element is in said second conformation; and
    means for separately applying sufficient heat to said first and said second portions of said SMA element to reciprocate said cursor between said first and said second positions wherein said means for separately applying heat comprises a first electrical circuit that includes said first portion of said SMA element and a second electrical circuit that includes said second portion of said SMA element, said first and second circuits sharing a common ground fixedly attached to a mounting surface upon which said substrate is mounted.

2. The SMA switch of claim 1 further comprising a first contact arm situated adjacent said cursor, said first contact arm having an open position and a closed position, said cursor being in sliding contact with said first contact arm to move said first contact arm from said open position to said closed position as said cursor moves from said second position to said first position.

3. The SMA switch of claim 2 wherein said first contact arm is electrically conductive.

4. The SMA switch of claim 2 further comprising a second contact arm and an electrically conductive short bar disposed on said cursor to create first and second electrical contact points, said first and second contact arms being biased to contact said cursor such that, when said cursor is in said first position, said first and said second contact arms are electrically coupled to each other via said short bar to close said SMA switch, said bias of said first and said second contact arms providing a force to maintain said cursor in said first position.

5. The SMA switch of claim 2 wherein said cursor has two lateral side surfaces, one of said lateral side surfaces having a first cut-away portion dimensioned to interlock with said first contact arm and the other of said lateral side surfaces having a second cut-away portion to interlock with a second contact arm such that said interlocking between said lateral side surfaces and said first and second contact arms maintains movement of said cursor substantially within a single plane as said cursor moves between said first and second positions.

6. The SMA switch of claim 4 wherein said first and second electrical contact points are recessed within said cursor to receive said first and said second contact arms.

7. The SMA switch of claim 2 wherein said first contact arm is situated within a travel path of said cursor such that said first contact arm is displaced by said cursor as said cursor moves from said second to said first position, said displacement bringing said first contact arm into contact with a second contact arm to place said first contact arm into said closed position.

8. The bistable SMA switch of claim 7 wherein said cursor has a lateral surface in contact with said first contact arm said lateral surface including a projection located at a position on said lateral surface such that as said cursor moves from said second position to said first position, said first contact arm first encounters a first slope of said projection that displaces said first contact arm into abutting engagement with said second contact arm and as said cursor continues toward said first position, said fist contact arm encounters a second slope of said projection that permits displacement of said first contact arm in a direction opposite to said displacement caused by said first slope as said cursor moves from said second to said first position.

9. The SMA switch of claim of 8 wherein said second contact arm is biased to exert a force on said first contact arm that has a component which is substantially perpendicular to a direction of travel of said cursor between said first and second positions, said component of said force acting against said projection to provide resistance against movement of said cursor from said first to said second position.

10. The switch of claim 1 further comprising a spring component connected to said SMA element to maintain an electrical connection between said SMA element and said common electrical ground while permitting said SMA element to alternate between said first and second conformations.

11. The switch of claim 1 further comprising a brush element in sliding contact with said common electrical ground, said brush element being connected to said SMA element to maintain an electrical connection between said SMA element and said common electrical ground while permitting said SMA clement to alternate between said first and second conformations.

12. The switch of claim 1 wherein said common ground comprises a wire bond electrically connecting said SMA element to said mounting surface via said cursor.

13. A bistable shape memory alloy (SMA) switch comprising:
   a substrate;
   a transducer connected to said substrate comprising a single continuous SMA element having first and second conformations and including:
   a) a first beating unit coupled to a fit segment of said SMA element to heat said first segment above a predetermined temperature causing contraction of said first segment so that said SMA clement assumes said first conformation; and
   b) a second heating unit coupled to a second segment of said SMA element to heat said second segment above said predetermined temperature causing contraction of said second segment so that said SMA element assumes said second conformation, wherein said first and said second heating units respectively comprise a first electrical circuit and a second electrical circuit, said first and said second electrical circuits sharing a common node on said SMA element that includes an electrical ground fixedly attached to a mounting surface upon which said substrate is mounted and a spring component extending from said electrical ground to said SMA element to maintain electrical connectivity between said SMA element and said electrical ground while permitting movement of said SMA element between said first and said second conformations;
   a cursor coupled to said SMA element to reciprocate between first and second positions as said SMA element alternates between said first and said second conformations; and
   a first contact arm in sliding contact with said cursor to move from an open position to a closed position as said cursor moves from said second to said first position.

14. The SMA switch of claim 13 wherein said cursor includes a short bar having first and second contact points, said bistable SMA switch further comprising a second contact arm wherein said first and said second contact arms are both biased to contact said cursor such that, when said cursor is in said first position, said first and said second contact arms are electrically coupled via said short bar, said first contact arm is mechanically coupled to said first contact point, and said second contact arms is mechanically coupled to said second contact point.

15. The SMA switch of claim 14 wherein said first and said second contact points are recessed into said cursor.

16. The SMA switch of claim 13 further comprising a second contact arm, said first contact arm being situated within a travel path of said cursor such that said first contact arm is moved into said closed position to contact said second contact arm as said cursor moves from said second to said first position.

17. A shape memory alloy (SMA) switch comprising having open and closed states comprising:
   a substrate;
   a single continuous SMA element connected to said substrate at first and second locations and having first and second sections, said first section contracting to place said SMA clement into a first conformation upon being heated above a predetermined temperature and said second section contracting to place said SMA element into a second conformation upon being heated above said predetermined temperature;
   a cursor coupled to said SMA element substantially between said first and said second sections to reciprocate between first and second positions as said SMA element alternates between said first and said second conformations;
   a first contact arm biased toward said cursor for sliding contact with said cursor as said cursor moves from said first to said second position, said first contact arm being positioned within a travel path of said cursor so that as said cursor moves from said second to said first position, said first contact arm becomes electrically coupled to a second contact arm to trigger said closed state of said SMA switch; and
   means for separately and independently heating said first and said second sections of said SMA element.

18. The SMA switch of claim 17 wherein a bias of one of said first and said second contact arms toward said cursor exerts a force on said cursor to maintain said closed state of said switch when said cursor is in said first position.

19. The SMA switch of claim 17 wherein said heating means includes a first electrical circuit that includes said first section of said SMA element and a second electrical circuit that includes said second section of said SMA element.

20. The switch of claim 19 wherein said first and said second electrical circuits share a common node comprising an electrical ground fixedly attached to a mounting surface upon which said substrate is mounted and a spring component connected to said SMA element to provide electrical connectivity between said SMA element and said common ground while permitting movement of said cursor between said first and said second positions.

21. The SMA switch of claim 19 wherein said first and said second electrical circuits include a common node comprising an electrical ground fixedly attached to a mounting surface upon which said substrate is mounted and a brush element in sliding contact with said electrical ground and fixedly attached to said SMA element to provide electrical connectivity between said SMA element and said common ground while permitting movement of said cursor between said first and said second positions.

22. The SMA switch of claim 17 further comprising an electrically conductive short bar disposed on said cursor to create first and second electrical contact points, said first and second contact arms being positioned with respect to said cursor such that, when said cursor is in said first position, said first and said second contact arms are electrically coupled to each other via said short bar to close said SMA switch.

23. The SMA switch of claim 17 wherein said cursor has two lateral side surfaces, one of said lateral side surfaces having a first cut-away portion dimensioned to interlock with said first contact arm and the other of said lateral side surfaces having a second cut-away portion to interlock with said second contact arm such that said interlocking between said lateral side surfaces and said first and second contact arms maintains movement of said cursor substantially within a single plane as said cursor moves between said first and second positions.

24. The SMA switch of claim 17 wherein said first contact arm is situated within a travel path of said cursor such that said first contact arm is displaced by said cursor as said cursor moves from said second to said first position, said displacement bringing said first contact arm into contact with said second contact arm.

* * * * *